United States Patent [19]

Johnson

[11] 4,024,797

[45] May 24, 1977

[54] SPRING CENTERED BALANCED RESOLVER VALVE

[75] Inventor: Howard L. Johnson, Joliet, Ill.

[73] Assignee: Caterpillar Tractor Co., Peoria, Ill.

[22] Filed: Oct. 28, 1975

[21] Appl. No.: 626,423

[52] U.S. Cl. .............................. 91/412; 91/411 R; 91/451; 137/102; 137/112

[51] Int. Cl.² .................. F15B 11/16; F15B 13/08

[58] Field of Search ................ 91/411 R, 451, 412; 137/102, 112

[56] References Cited

UNITED STATES PATENTS

| | | | |
|---|---|---|---|
| 2,354,791 | 8/1944 | Boldt | 137/112 |
| 2,982,260 | 5/1961 | Hunter | 137/112 X |
| 3,434,286 | 3/1969 | Raizes | 137/112 X |
| 3,693,506 | 9/1972 | McMillen et al. | 91/412 |
| 3,774,707 | 11/1973 | Bridwell et al. | 180/6.48 |
| 3,817,153 | 6/1974 | Zuner | 91/411 R |
| 3,831,620 | 8/1974 | Bianchetta et al. | 137/269 |
| 3,902,401 | 9/1975 | Allen et al. | 91/451 X |

FOREIGN PATENTS OR APPLICATIONS 827,765  2/1960  United Kingdom ............... 137/112

*Primary Examiner*—Irwin C. Cohen
*Attorney, Agent, or Firm*—Phillips, Moore, Weissenberger, Lempio & Majestic

[57] ABSTRACT

A hydraulic system including a source of pressurized fluid, a plurality of hydraulic motors with a plurality of control valves for directing fluid from the source to the motors, a dual-stage relief valve for the system for normally establishing a first pressure for part of the system for some of the motors and a second pressure for part of the system for the remainder of the motors and responsive to at least a pair of the control valves of the system for establishing the higher pressure includes a balanced resolver valve disposed between the pair of directional control valves and the relief valve and operative to prevent simultaneous communication of the pair of valves with the relief valve.

3 Claims, 1 Drawing Figure

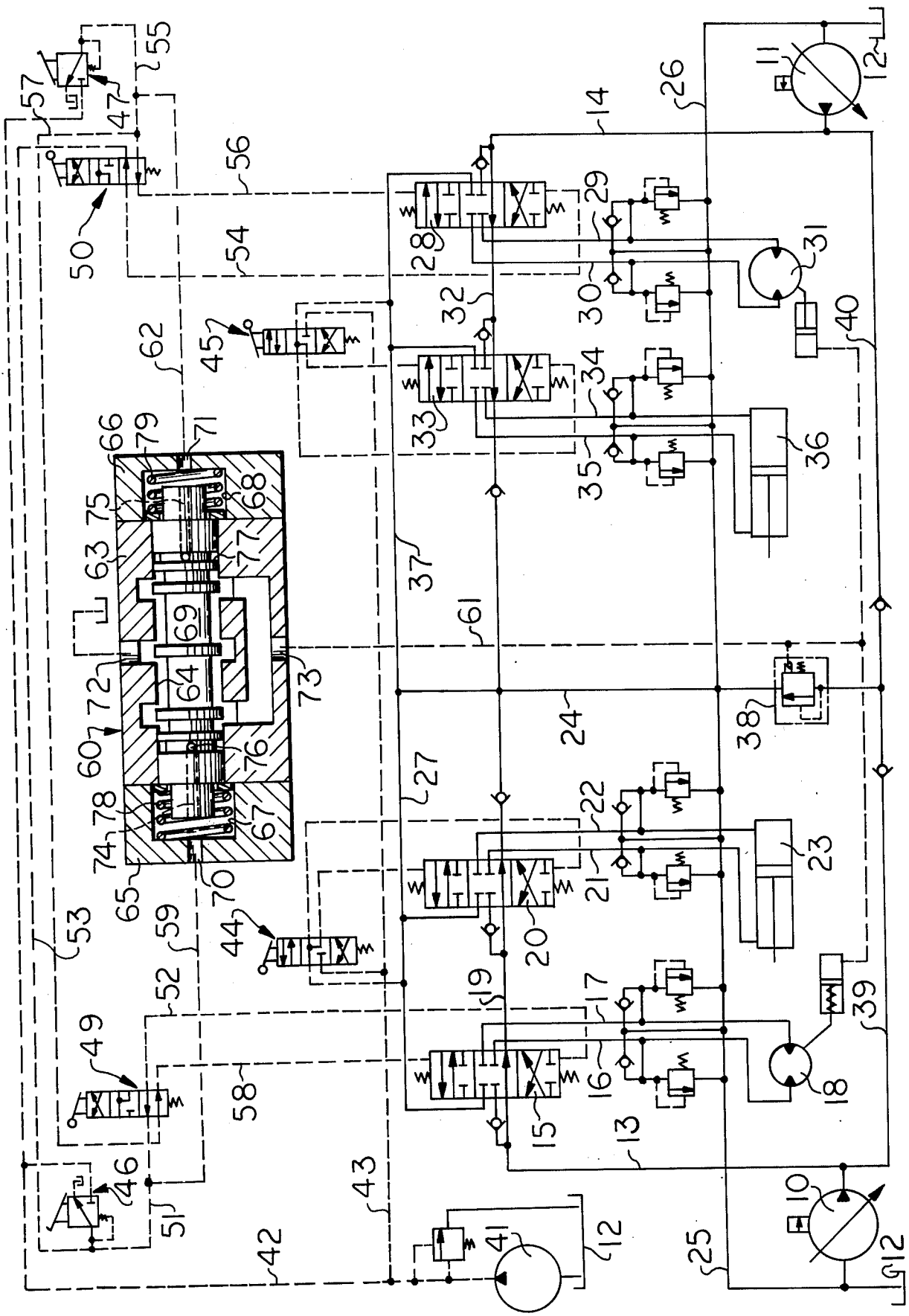

SPRING CENTERED BALANCED RESOLVER VALVE

BACKGROUND OF THE INVENTION

The present invention relates to hydraulic systems and pertains particularly to a dual pressure system with means for ensuring a separation of the pressure within the system.

Some hydraulic systems employ different pressures for different portions of the system. For example, some motors of the system may be designed to operate at much higher pressures than other motors of the system. The higher-pressure motors are required to perform functions that require the higher pressures, whereas the lower-pressure motors perform certain functions that do not require such high pressures. Accordingly, such systems are normally designed such that the fluid for the system is supplied by a single pump or source of fluid with dual-stage relief valves for establishing the higher and lower stage pressures.

Such systems are normally designed such that the lower pressure prevails when the lower-pressure motors are being operated and the high pressure prevails when the higher-pressure motors are being operated. This is normally accomplished by dual-stage relief valves which are normally set at the lower-stage pressure but is responsive to directional control valves of the higher-pressure motors for directing the fluid for controlling the multistage relief valve when the higher-pressure motors are in operation. Such systems must also be arranged such that the higher-pressure motors and the lower-pressure motors are not required to be operated at the same time. Such systems, which have this arrangement, can be supplied from a single pump or a single series of pumps with a common supply and with a multistage relief valve as discussed above.

An example of a system employing such dual-stage relief valves is shown, for example, in U.S. Pat. No. 3,831,620, issued Aug. 27, 1974 to Donald L. Bianchetta et al and assigned to the assignee hereof. The above-described system also discloses such a dual-stage pressure relief valve. A high-pressure portion of such a high pressure or multistage system is also disclosed in U.S. Pat. No. 3,774,707, issued Nov. 27, 1973 to John W. Bridwell et al and similarly assigned to the assignee hereof. Such systems normally employ shuttle valves between the respective high-pressure control valves of the high-pressure system and the relief valve for permitting a selected one of the control valves to communicate with the relief valve for establishing the higher pressure of the system. A simple shuttle-type or ball-type shuttle valve such as 106 in the above-mentioned Bianchetta patent is normally employed.

Such valves, however, have been found to be unsatisfactory in certain applications such as, for example, wherein the valve is employed between the forward and reverse drive of the vehicle. Such dual-stage hydraulic systems may be found, for example, on hydraulic excavators. Such excavators may employ, for example, a high-pressure system on the order of 4400 psi for operating the track drive of the vehicle and a lower pressure on the order of 3600 psi for operation of the implements of the vehicle. With such systems, the higher pressure is necessary in the drive system in order to obtain sufficient power to move the vehicle, however, it is not necessary that the implements be operated at the much higher pressure. For this reason, the implement system is not normally designed for the higher pressures. Such higher pressures, therefore, may cause failure of components of the lower-pressure system such as the conduits and the like which communicate the fluid to the respective motors.

Systems such as described above have been found to have been operated at the higher pressures by operators who have learned to override the relief valve simply by depressing a pair of the control valves of the high-pressure system simultaneously to cancel each other out and at the same time to increase the relief valve to the higher pressure stage. This is accomplished by simultaneous depression of the forward and reverse control valves. The higher pressure and speeds resulting from this operation can cause early failure of the components of the system.

SUMMARY AND OBJECTS OF THE INVENTION

It is the primary object of the present invention to overcome the above problems of the prior art.

Another object of the present invention is to provide a dual-pressure hydraulic system with means for ensuring a separation of the pressures of the system.

A further object of the present invention is to provide a dual-pressure hydraulic system having a dual-stage relief valve for establishing the dual pressures of the system with the balanced reservoir valve disposed between the dual-stage relief valve and control valves of the system to ensure that the relief valve is communicated with only a single one of the controls valves at a given time.

In accordance with the primary aspect of the present invention, a hydraulic system having a dual-stage relief valve for establishing the dual pressures of the system is provided with valve means for preventing overriding of the pressure relief valve for operation on the lower-pressure system to obtain the higher pressure of the system.

BRIEF DESCRIPTION OF THE DRAWING

The above and other objects and advantages of the present invention will become apparent from the following description when read in conjunction with the drawing wherein the single figure is a schematic illustration of a dual-pressure hydraulic system embodying the present invention.

DETAILED DESCRIPTION OF A PREFERRED EMBODIMENT

Turning now to the drawing, a circuit embodying the present invention comprises a pair of variable displacement pumps 10 and 11 drawing hydraulic fluid from a reservoir or tank 12 and supplying it by way of supply lines or conduits 13 and 14 to a series of valves, which valves in turn control the direction of pressurized fluid to a plurality of motors for operation thereof. Fluid from pump 10 is supplied along supply conduit 13 to a first pilot-operated directional control valve 15 which is operative to direct fluid by way of a pair of motor control lines 16 and 17 to a rotary motor 18 which in this system is a track drive motor. The valve 15 is an open-centered valve such that fluid not used by the valve passes therethrough by way of a conduit 19 to a second pilot-operated directional control valve 20 which is operative to direct fluid by way of motor control lines 21 and 22 to a double-acting hydraulic motor 23. In this circuit the motor 23 is for the operation of one or more of the implements of the machine. Fluid not used by the valve 20 passes therethrough by way of suitable passages to a return line 24 which returns the fluid by way of return lines 25 and 26 to the tank or reservoir 12.

Fluid exhausted from the respective motors flows along return passage 27 of the valve body to the return line 24 for returning to the tank or reservoir 12.

Fluid supplied along conduit 14 from pump 11 is supplied to pilot-operated control valve 28 which is operative to direct the fluid by way of motor control lines 29 and 30 to a rotary reversible hydraulic motor 32 for a track drive of the vehicle. Fluid not directed by valve 28 to the motor 30 passes around a conduit 32 to another pilot-operated directional control valve 33 which is operative to supply the fluid by way of motor control lines 34 and 35 to a hydraulic motor 36 for operation of implements of the vehicle. Exhaust fluid from the respective motors is directed to a return passage 37 in the valve body for return to return line 24 for communication back to the tank 12.

The maximum pressure delivered by the pumps of the system is controlled by a dual-stage pressure relief valve 38 disposed between the outlets of the pumps 10 and 11 and the tank 12. The dual-stage relief valve 38 is disposed in conduits 39 and 40 between outlets of pumps 10 and 11 and the return lines 25 and 26 to the tank 12. The above-described hydraulic circuit is an example of a circuit used in a hydraulic excavator. The system is designed to supply maximum pressure of approximately 4400 psi to the track drive motors 18 and 31 to obtain maximum power for the size of the motors. The system is then operative to supply fluid at approximately 3600 psi to the implements motors of the system 23 and 36. The above-described hydraulic system is controlled by a pilot circuit which supplies pilot fluid for shifting of the respective valves and for release of brakes of the system and the like. The dual-stage pressure relief valve 38 is tied in to this pilot system such that when the pilot valves which shift valves 15 and 28 for the high-pressure track system is operated, the pilot system operates to control the relief valve 38 for its higher setting for 4400 psi.

The pilot control system for the present hydraulic system comprises a pump 41 which draws fluid from tank 12 and supplies it by way of supply conduits 42 and 43 to a plurality of pilot control valves for controlling the respective directional control valves. Pressurized fluid supplied by way of branch 43 of the supply line is communicated first to a pilot control valve 44 which is operative to direct fluid to either side of valve 20 for shifting the valve to communicating position for control of motor 23. Fluid is also supplied by way of pilot line 43 to the pilot control valve 45 which is operative to direct fluid to either side of directional control valve 33 for selectively controlling the position of that valve for direction of fluid to either side of motor 36. Pilot fluid is communicated along conduit 42 from pump 41 to forward and reverse valves 46 and 47 which are operative to direct fluid for shifting of valves 15 and 28 for controlling the operation of motors 18 and 31. One of the valves 46 or 47 directs the fluid in the direction to drive the motors simultaneously in the forward direction whereas the other valve is operative to direct the motors of valves to direct the motors in the reverse direction. The steering valves 47 and 50 are operative to alter the signals communicated to the valves by means of either one of the forward or reverse valves to effect a steering of the vehicle. Valve 46, for example, is operative to direct fluid from supply conduit 42 along a conduit 51 through valve 49 to a line 52 to one side of valve 15 for shifting the valve upward as seen in the drawing. A branch line 53 from valve 46 directs fluid through valve 50 to one side of the control valve 28 for shifting that valve upward by way of control line 54.

The reverse valve 47 is operative to direct pilot fluid along line 55 through valve 50 and through line 56 for shifting the valve 28 downward at the same time fluid is communicated along pilot line 57 through steering valve 49 and along a pilot line 58 to shift valve 15 downward. Thus one of the valves 46 shifts both control valves 15 and 28 in one direction and the other of the forward and reverse valves 47 shifts both of control valves 15 and 28 in the opposite direction.

When valve 46 is activated to shift the valves 15 and 28, the fluid communicated thereby is also communicated along a branch line 59 to one end of a balanced resolver valve 60 for shifting that valve to permit communication of pilot fluid by way of a pilot line 61 to the dual-stage relief valve 38. Similarly, when valve 47 is shifted for directing pilot fluid for shifting either one of valves 15 and 28, the pilot fluid is also communicated along a line 62 to the opposite side of valve 60 where it is then communicated by way of line 61 to the dual-stage relief valve 38. The valve 60 is effective to communicate only one of lines 59 or 62 and hence one of the valves 46 or 47 by way of that valve 60 and pilot line 61 to the pilot or dual-stage relief valve 38. Thus when one of valves 46 or 47 is communicated by way of pilot line 61, the valve 60 blocks the other of the valves 46 or 47. The resolver valve 60 includes a central housing 63 having a through-bore 64, a pair of end caps 65 and 66 each with bores 67 and 68 concentric with and defining chambers at the ends of bore 64. A valve spool 69 is centrally disposed within the bore 64 and is operative to control communication between a pair of inlets 70 and 71 and a pair of outlets 72 and 73. The inlets 70 and 71 are connected to the respective valves 46 and 47 and the outlet 73 is connected to the dual-stage relief valve 38. The valve spool 69 is such that only one of the inlets 70 and 71 may be communicated with the outlet 73 at any one time. At the same time that one of the inlets is communicated with the outlet 73, the other inlet is blocked. This prevents an overriding of the functions of the valves 46 and 47 to at the same time obtain a higher relief pressure in the system by overriding the operation of the dual-stage relief valve 38.

The valve 69 includes a passage 74 for communicating inlet 70 with a groove at 76 for communicating with outlet 73. A second passage 75 on the opposite end of the spool is operative to communicate inlet 71 with an outlet at a groove 77 for communicating with the outlet 73 when the spool is shifted in the opposite direction. Suitable centering means such as resilient springs 78 and 79 engage the ends of the spool 69 to bias it to a centered position.

While the present invention has been described and illustrated by means of a single embodiment, it is to be understood that numerous changes and modifications may be made therein without departing from the spirit and scope of the invention as described in the appended claims.

What is claimed is:

1. A hydraulic system comprising in combination a source of pressurized hydraulic fluid, a plurality of hydraulic motors, a plurality of control valves for directing fluid from said source to said motors, means for actuating said control valves to cause said control valves to transmit said fluid to selected one of said motors, a dual-stage pressure responsive relief valve communicating with said source for said system for normally establishing a first pressure for said system and for establishing a second different pressure for said system in response to pressurization of a relief valve pilot line, communicating therewith further comprising:

a balanced resolver valve having a first inlet connected to receive pressurized fluid upon actuation of a first of said control valves and having a second inlet connected to receive pressurized fluid upon actuation of a second of said control valves and having an outlet communicated with said relief valve pilot line, said resolver valve further having means for transmitting pressurized fluid from either of said inlets to said outlet when only one inlet is pressurized and having means for relieving pressure from said outlet when both of said inlets are pressurized and for preventing simultaneous communication of said inlets with said outlet.

2. The hydraulic system of claim 1 wherein said resolver valve comprises:

housing means having a cylindrical bore with a drain passage communicated therewith forming said outlet rehousing pressure means;

a valve spool mounted in said bore;

and wherein said first and second inlets are communicated respectively with opposite ends of said bore and said outlet is communicated with an intermediate portion of said bore, and means for biasing said spool to a centered position in said bore at which communication between said inlets and said outlet is blocked and at which said outlet is communicated with said drain passage.

3. The hydraulic system of claim 2 wherein said valve spool includes a pair of passages each communicating from a separate end of said spool to a separate one of a pair of annular grooves, said grooves being located on said spool so that a single one of said grooves may communicate with said outlet when said spool is shifted from said centered position.

* * * * *